A. M. VAN DOORN.
PIPE, CIGAR HOLDER, AND THE LIKE.
APPLICATION FILED MAR. 5, 1921.

1,408,847.

Patented Mar. 7, 1922.

Witnesses:

Inventor:
A. M. Van Doorn
by
Samuel Riquer
Attorney

UNITED STATES PATENT OFFICE.

ANTHONIUS M. van DOORN, OF UTRECHT, NETHERLANDS, ASSIGNOR TO UTRECHTSCHE PATENT PIJPEN INDUSTRIE, OF UTRECHT, NETHERLANDS, A CORPORATION OF THE NETHERLANDS.

PIPE, CIGAR HOLDER, AND THE LIKE.

1,408,847.   Specification of Letters Patent.   Patented Mar. 7, 1922.

Application filed March 5, 1921. Serial No. 450,053.

*To all whom it may concern:*

Be it known that I, ANTHONIUS M. VAN DOORN, a subject of the Queen of the Netherlands, and residing at Utrecht, in the Netherlands, 32 Bladstraat, have invented certain new and useful Improvements in Pipes, Cigar Holders, and the like, of which the following is a specification.

My invention relates to improvements in pipes, cigar holders, and the like, and more particularly in pipes or cigar holders of the type in which the stem is provided with a tube split along the longitudinal axis into two sections which sections are held together by an internally tapering tubular member cooperating with corresponding externally tapered portions of the sections of the tube. The object of the improvements is to provide a pipe of this type in which the split tube can readily be applied to or withdrawn from the stem of the pipe or cigar holder without the necessity of screwing the parts together or of unscrewing them. Another object of the improvements is to provide a pipe or cigar holder which as to its artistic appearance is not inferior to pipes or cigar holders of ordinary type. With these and other objects in view my invention consists in constructing the tubular member for clamping the sections of the tube together in the form of an internally screw-threaded and tapering ring adapted to be screwed on a corresponding outer screw-threaded and tapering portion of the tube, which screw-threaded portion of the tube is located in the assembled position of the parts adjacent to the end of the stem of the pipe or cigar holder, the outer end of the tube providing the mouth piece. Therefore the outer appearance is substantially the same as that of an ordinary pipe, the ring having the function to cover the joint between the stem and the mouth piece.

In order that the invention be more clearly understood an example embodying the same has been shown in the accompanying drawing, in which the same letters of reference have been used in all the views to indicate corresponding parts. In said drawing.

Figure 1:
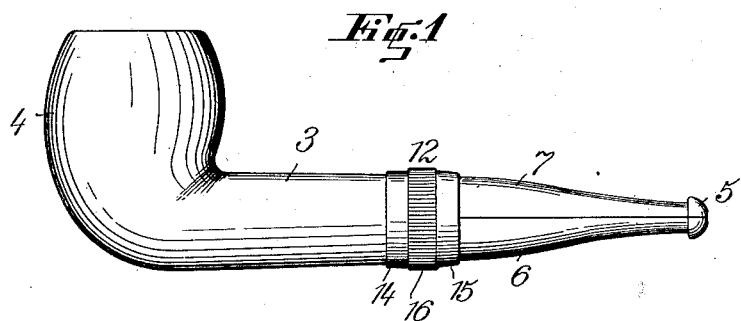
Fig. 1, is a side view of the pipe.
Figure 2:
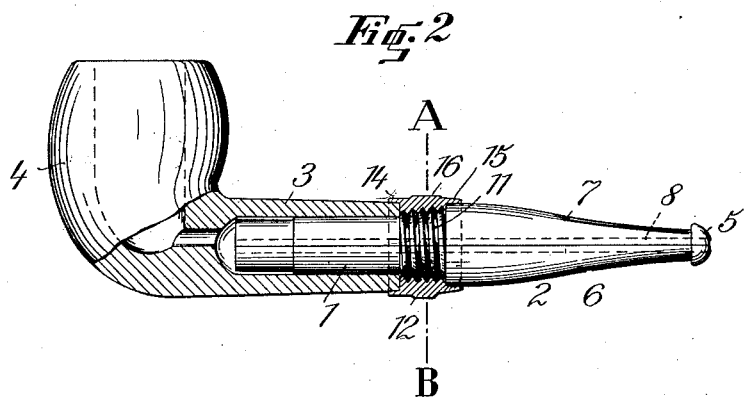
Fig. 2, is a similar side view partly in section.
Figure 3:
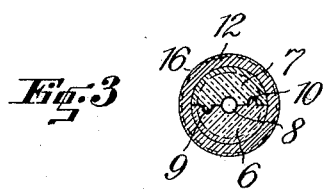
Fig. 3, is a cross-section taken on the line A—B of Fig. 1.
Figures 4, 5:
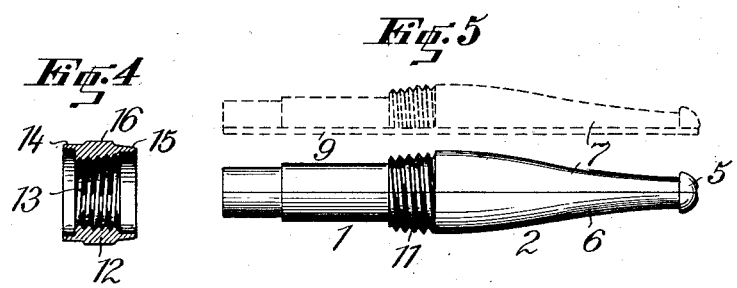
Fig. 4, is a longitudinal section of the clamping ring.
Fig. 5, is a detail view the full lines showing the split tube and the dotted lines one of the sections of the tube.

In the figures I have illustrated the invention as used in a pipe of the bull-dog pattern. But I wish it to be understood that my invention is not limited to the use in a pipe. As shown the pipe consists of a bowl 4, a stem 3, a tube 1 fitted within the stem 3 and made integral with a mouth piece 2, 5. The tube 1, 2, 5, is split longitudinally into two sections indicated by the numerals 6, 7, and it is formed with a longitudinal bore 8. The sections are jointed by means of longitudinal ribs 9, 10 and corresponding grooves, the rib 9 being provided on the section 7 and the rib 10 on the section 6, as appears from Fig. 3.

The portion 11 of the tube 1 which is adjacent to the end of the stem 3 is screw-threaded and the screw-threaded part tapers from its outer end towards the end of the stem 3. The screw-threaded portion 11 is engaged by a clamping ring 12 formed with internal screw-threads 13 and having a taper corresponding to that of the portion 11. At opposite sides of the screw-threaded portion 13 the ring is formed with cylindrical flanges 14 and 15 embracing respectively the outer portion of the stem 3 and that of the mouth piece 2, and between the said flanges it is formed with a milled part of increased diameter.

The outer appearance of the improved pipe is similar to that of a pipe of ordinary construction, the difference residing exclusively in the sectional line appearing between the sections 6 and 7 of the mouth piece, which sectional line can be seen only upon close inspection. By the engaging screw-threads 11 and 13 the sections 6 and 7 are pressed in close contact with each other, and in addition the said sections are brought into correct relation to each other longitudinally of the axis of the stem of the pipe. The tube 1, 2 can readily be removed from the stem 3 by withdrawing the same therefrom. The tapering screw-threaded portions 11, 13 cause a strong pressure for holding the sections 6, 7 in engagement with each other.

In some cases it will be preferred for economical reasons to provide cylindrical screw-threads 11, 13 in lieu of the tapering threads. In such cases I provide smooth tapering portions at a part adjacent to the cylindrical screw-threaded portions of the ring 12 and the tubular member 2. The construction described in which tapering screw-threaded portions are provided is particularly advantageous because the tapering portion is substantially at the middle of the tubular member 1. 2. Therefore the sectional members 6 and 7, which by reason of their length tend to bear upon each other at their ends only and to be out of contact at their middle, are securely held in contact with each other over the whole length thereof, so that there is no danger of leakage.

I claim:

1. A pipe, cigar holder, or the like, comprising a stem, a tube split longitudinally of its axis into sections, fitting within said stem and tapered and screw-threaded at a part adjacent to the end of the stem, and an internally tapered and screw-threaded ring for clamping said sections together.

2. A pipe, cigar holder, or the like, comprising a stem, a tube split longitudinally of its axis into sections, fitting with one end within said stem, formed at the end projecting from the stem into a mouth piece and tapered and screw-threaded at a part adjacent to the end of the stem, and an internally tapered and screw-threaded ring for clamping said sections together.

3. A pipe, cigar holder, or the like, comprising a stem, a tube split longitudinally of its axis into sections and fitting with one end within said stem and formed at the end projecting from the stem into a mouth piece and formed at a part adjacent to the end of the stem and substantially at its middle with tapered and screw-threaded portions, and an internally tapered and screw-threaded ring for clamping said sections together.

In testimony whereof I hereunto affix my signature in presence of two witnesses.

ANTHONIUS M. van DOORN.

Witnesses:
Hy Kuykers,
W. Shangendyk.